United States Patent

Iida et al.

[11] Patent Number: 5,995,987
[45] Date of Patent: Nov. 30, 1999

[54] PROGRAMMING METHOD AND PROGRAMMING UNIT FOR PROGRAMMABLE CONTROLLER IN WHICH ONLY COMMON NAMES FOR APPLICATION INSTRUCTIONS NEED BE DESIGNATED BY THE PROGRAMMER

[75] Inventors: Naomi Iida; Sakuyuki Onishi, both of Aichi, Japan

[73] Assignee: Mitsubishi Denki Kabushiki Kaisha, Tokyo, Japan

[21] Appl. No.: 08/135,188

[22] Filed: Oct. 12, 1993

Related U.S. Application Data

[63] Continuation of application No. 07/548,691, Jul. 5, 1990, abandoned.

[30] Foreign Application Priority Data

Jul. 10, 1989 [JP] Japan ...................................... 1-177601
Jan. 10, 1990 [JP] Japan ........................................ 2-2863

[51] Int. Cl.⁶ ............................... G06F 9/44; G06F 15/00
[52] U.S. Cl. .......................... 708/130; 364/191; 364/192; 364/194; 364/147
[58] Field of Search ............................ 708/130; 364/191, 364/192, 194, 147

[56] References Cited

U.S. PATENT DOCUMENTS

| | | | |
|---|---|---|---|
| 3,614,740 | 10/1971 | Delagi | 395/425 |
| 3,909,797 | 9/1975 | Goss et al. | 395/375 |
| 4,028,538 | 6/1977 | Olander, Jr. et al. | 364/709.16 |
| 4,041,462 | 8/1977 | Davis et al. | 395/775 |
| 4,298,949 | 11/1981 | Poland | 364/706 |
| 4,381,559 | 4/1983 | Reach et al. | 364/709.09 |
| 4,455,619 | 6/1984 | Masui et al. | 395/160 |
| 4,608,661 | 8/1986 | Sasaki . | |
| 4,807,178 | 2/1989 | Fujiwara et al. | 395/275 |
| 4,811,257 | 3/1989 | Sumitani et al. | 364/709.01 |
| 4,866,663 | 9/1989 | Griffin | 395/500 |
| 5,093,796 | 3/1992 | Takada et al. | 364/474.22 |
| 5,175,828 | 12/1992 | Hall et al. | 395/375 |

FOREIGN PATENT DOCUMENTS 0 317 477   5/1989   European Pat. Off. .
2077966   12/1981   United Kingdom .

OTHER PUBLICATIONS

IEEE Conference Record of 1987, Thirty–ninth Annual Conference of Electrical Engineering Problems in the Rubber and Plastics Industries, Apr. 6, 1987, Akron, Ohio, US, pp. 14–19.

Trends in Program Development Software for Programmable Control Systems, J. Stanley (author), Cleveland, Ohio, p. 14, right col., lines 7–42, and p. 15, right col., lines 36–64.

*Primary Examiner*—Krisna Lim
*Attorney, Agent, or Firm*—Sughrue, Mion, Zinn, Macpeak & Seas, PLLC

[57] ABSTRACT

A programming system for a programmable controller is improved by providing for automatic retrieval of the execution programs corresponding to application instructions which do not form a part of the basic program instruction set. Application instructions embedded within a sequence program are recognized and their common operation names are displayed on the operator's display. The corresponding execution instructions are retrieved and subsequently combined with the sequence program while the operator monitors the retrieval operation on the display. After the execution instructions have all been copied over into the memory for the sequence program, the application instructions may optionally be rewritten as standard subroutine instructions including the head address of the given set of execution instructions, to avoid the need for a symbol table to interpret between application instruction names and the corresponding head address for the execution instructions.

1 Claim, 8 Drawing Sheets

| PROGRAM NAME | READ |
|---|---|
| SIN | |
| TAN | |
| ASCII | |

| PROGRAM NAME | READ |
|---|---|
| SIN | ★ |
| TAN | ★ |
| ASCII | |

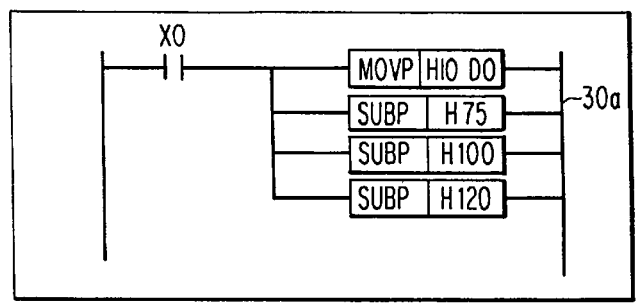
FIG. 9
PRIOR ART
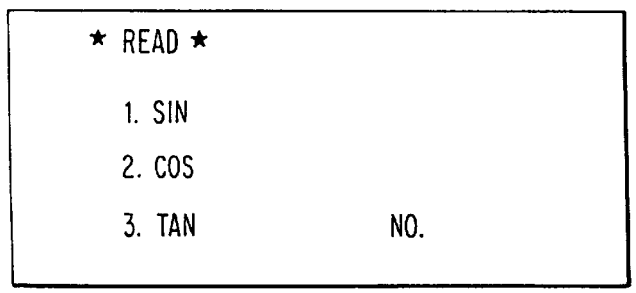
FIG. 10
PRIOR ART
FIG. 11
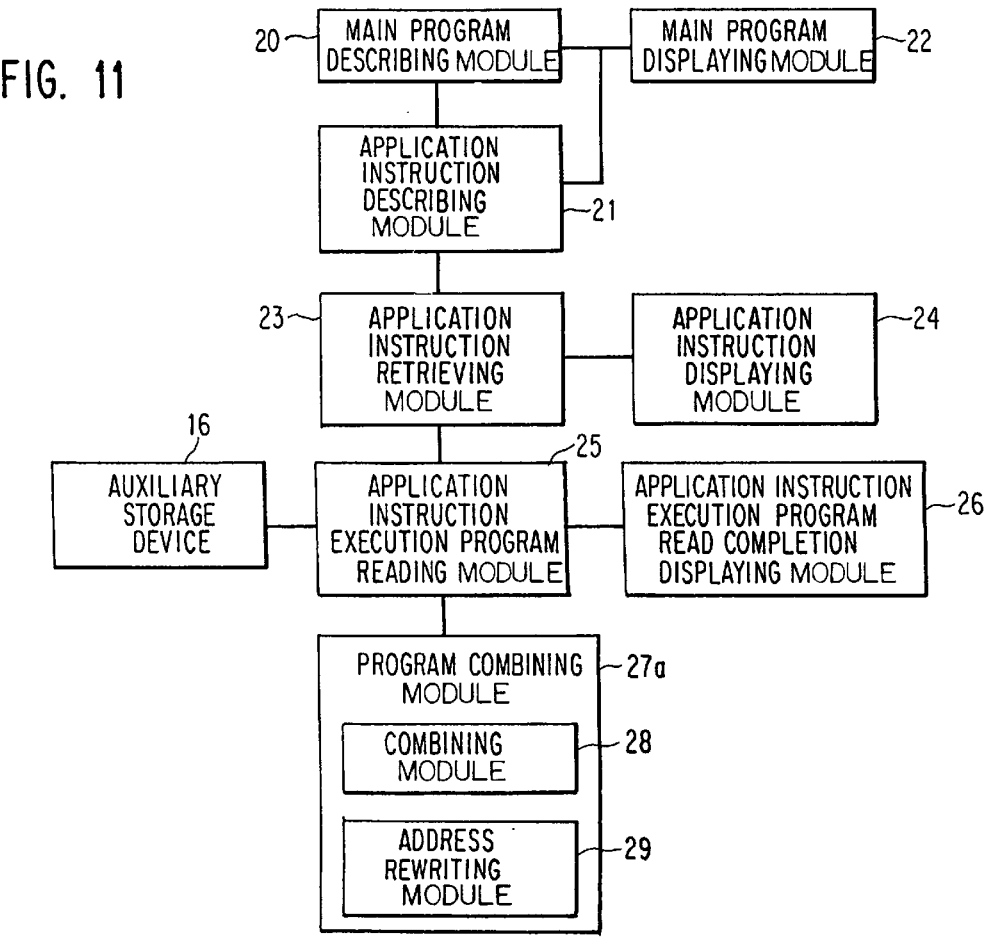

PROGRAMMING METHOD AND PROGRAMMING UNIT FOR PROGRAMMABLE CONTROLLER IN WHICH ONLY COMMON NAMES FOR APPLICATION INSTRUCTIONS NEED BE DESIGNATED BY THE PROGRAMMER

This is a Continuation of application Ser. No. 07/548,691 filed on Jul. 5, 1990, now abandoned.

BACKGROUND OF THE INVENTION

The present invention relates to a programming method and a programming unit for a programmable controller, which is used to write sequence programs using both basic program instructions and application instructions which are not provided as basic program instructions.

FIG. 6 shows the general configuration of a programmable controller (hereinafter referred to as a "PC") and a programming unit of the type used in the prior art. In FIG. 6, the controller unit 1 includes the main sections of the PC, i.e. a central processing unit (hereinafter referred to as the "CPU") 2, an interface 3 to a programming unit 11 which will be discussed later, a memory 4 for storing the system program, a work area memory 5 used in executing the aforementioned system program, a memory 6 for storing user programs, and an interface 7 for inputs/outputs. An I/O unit 8 inputs external information and outputs the operation results of the CPU 2, a coupling module 9 connects the I/O interface 7 and the I/O unit 8, and a cable 10 connects the interface 3 and the programming unit 11. The unit 11 used with the above PC comprises an interface 12, a CPU 13, a system program memory 14, a work area memory 15, an auxiliary storage 16 including an (unillustrated) floppy disk and floppy disk drive, which serves as an auxiliary memory area for storing application instruction execution programs corresponding to the above mentioned application instructions, a keyboard 17, and a display device 18.

FIG. 7 is a block diagram showing the main functions of the programming unit 11 of the prior art. The function blocks may be appropriately termed either as "tasks" or as module. The latter terminology will be employed herein. The functional modules (tasks) are performed/exhibited when the system program stored in the system program memory 14 is run by the CPU 13. In FIG. 7, the numeral 20 indicates a main program describing module for describing a sequence program. At 22 is a main program display module for causing the sequence program described by the main program describing module 20 to be displayed on a screen of the display device 18 in FIG. 6. At 26 is an application instruction execution program reading module for reading the application instruction execution programs corresponding to the application instructions used in the above sequence program for the auxiliary storage 16. Finally, 28 indicates a program combining module for combining the read-out application instruction execution programs with the sequence program.

FIG. 8 is a flowchart showing the processing procedure of sequence program writing in the prior art. According to this flowchart, an operator starts up the programming unit 11 shown in FIG. 6 at step 200. At Step 201 the operator writes a sequence program from the keyboard 17. The program is displayed on the display device screen at the same time. Namely, the main program describing module 20 in FIG. 7 creates a sequence program 30a as represented by the ladder diagram shown in FIG. 9 in accordance with data, basic instructions and application instructions entered from the keyboard 17 in FIG. 6 and stores it in a main memory area 14a of the system program memory 14 and also displays it in ladder form on the display device 18 through the main program displaying module 22. The application instructions are each indicated in the above sequence program 30a, as shown in, for example, the program segment of FIG. 9, by subprogram operation codes, for example "SUB" or "SUBP" ("P" indicates a one time command) and the head absolute address, e.g. H75, H100, H120, of the memory area which will store the application instruction execution programs corresponding to the application instructions, in order to call subroutines. At step 202, the operator selects and reads out the application instruction execution programs which execute the application instructions he wishes to use in the sequence program 30, e.g. sine "SIN", cosine "COS", tangent "TAN", etc. The desired programs are read out one by one from among those stored in the auxiliary storage module 16 through the application instruction execution program reading module 26. This is essentially a manual task on the part of the operator. That is, the operator must access the auxiliary storage where the instruction execution programs are stored, typically on a disk, and, using the disk directory, must specify the desired program. The actual program is then read out. It will ultimately be stored in the memory starting at the designated address (i.e. H75, etc.). The operation designators "SIN", "COS" and "TAN" appear on the display device screen as shown in FIG. 10 as the instruction execution programs are designated. At step 203, the operator judges whether all the application instruction execution programs required for the given sequence program 30 have been read or not. If the answer is no, he returns to step 202. If all the programs have been read out, the operator combines the above application instruction execution programs with the sequence program 30 stored in the main memory area 14a of the system program memory 14 using the program combining task 28, at step 204, thus completing construction of sequence program. The completed sequence program is then transferred from the programming unit 11 to the user program memory 6 in the controller unit 1 via the cable 10 in FIG. 6 and is used as a PC sequence program.

Because the programming unit 11 of the prior art is configured as described above, programming is extremely troublesome, i.e. it is necessary for the user to manually specify, one by one, the application instruction execution programs corresponding to the application instructions, since the application instructions are not available as basic program instructions, in reading the above application instruction execution programs from the auxiliary storage 16. It is also necessary for the operator to prompt the unit to combine the read-out application instruction execution programs with the sequence program, to complete the sequence program. It is easy for the operator to make a mistake in specifying the head address where the execution program will be found, i.e. to subsequently put the execution program in a memory location other than that designated. Further, since the operator may not have at hand information on the size of the execution program he wishes to use, he may space subsequent execution programs too far apart and use the memory inefficiently.

An object of the present invention is to solve these problems by way of a programming method and a programming unit which will allow application instructions used in a sequence program to be detected automatically, and corresponding application instruction execution programs to be automatically read from an auxiliary storage and combined with the sequence program.

SUMMARY OF THE INVENTION

The programming method of the invention includes the step of describing application instructions by their common names when writing a sequence program using application instructions unavailable as basic program instructions, the step of retrieving the application instructions in the sequence program by their operation designation names, and the step of automatically reading the application instruction execution programs corresponding to the application instructions from an auxiliary storage and combining the read programs with the sequence program.

The programming unit according to the invention is equipped with an application instruction describing module for describing application instructions, which are not provided as basic program instructions, by their names in writing a sequence program, an application instruction retrieving module for retrieving the application instructions in the sequence program by module of those operation designation names, an application instruction execution program reading module for automatically reading the application instruction execution programs, corresponding to the application instructions retrieved by the above application instruction retrieving module, from the auxiliary storage, and a program combining module for combining the read-out application instruction execution programs with the sequence program.

BRIEF DESCRIPTION OF THE DRAWINGS

FIG. 9 shows an example of a display screen indication of a sequence program written by the programming unit illustrated in FIG. 7.

FIG. 10 shows an example of a display screen indication of the application instruction execution programs read by the programming unit of FIG. 7.

FIG. 11 is a block diagram showing the functional outline of a further embodiment of the invention.

In the figures, the same symbols indicate the same or similar elements.

DESCRIPTION OF THE PREFERRED EMBODIMENTS

In the invention, application instructions are described using their common operation designation names in writing a sequence program, the application instructions in the sequence program thus written are picked out by their operation designation names, and application instruction execution programs corresponding to the retrieved application instructions are automatically read from the auxiliary storage and combined with the sequence program.

According to the apparatus of the invention, the application instruction describing means describes the sequence program using the common names of application instructions which are not provided to the programmable controller as basic program instructions, the application instruction retrieving module picks out the application instruction from the sequence program using these operation designation names, the application instruction execution program reading module automatically reads the corresponding application instruction execution programs for executing the retrieved application instructions from the auxiliary storage, and the program combining module combines the application instruction execution programs with the sequence program.

Embodiments of the invention will be explained according to FIGS. 1 through 6 and 11–13. In the first embodiment, the hardware of the PC and the programming unit are the same as those described in the prior art shown in FIG. 6. The portions represented by the same symbols as in the prior art are the same or similar to those in the prior art.

Figure 1:
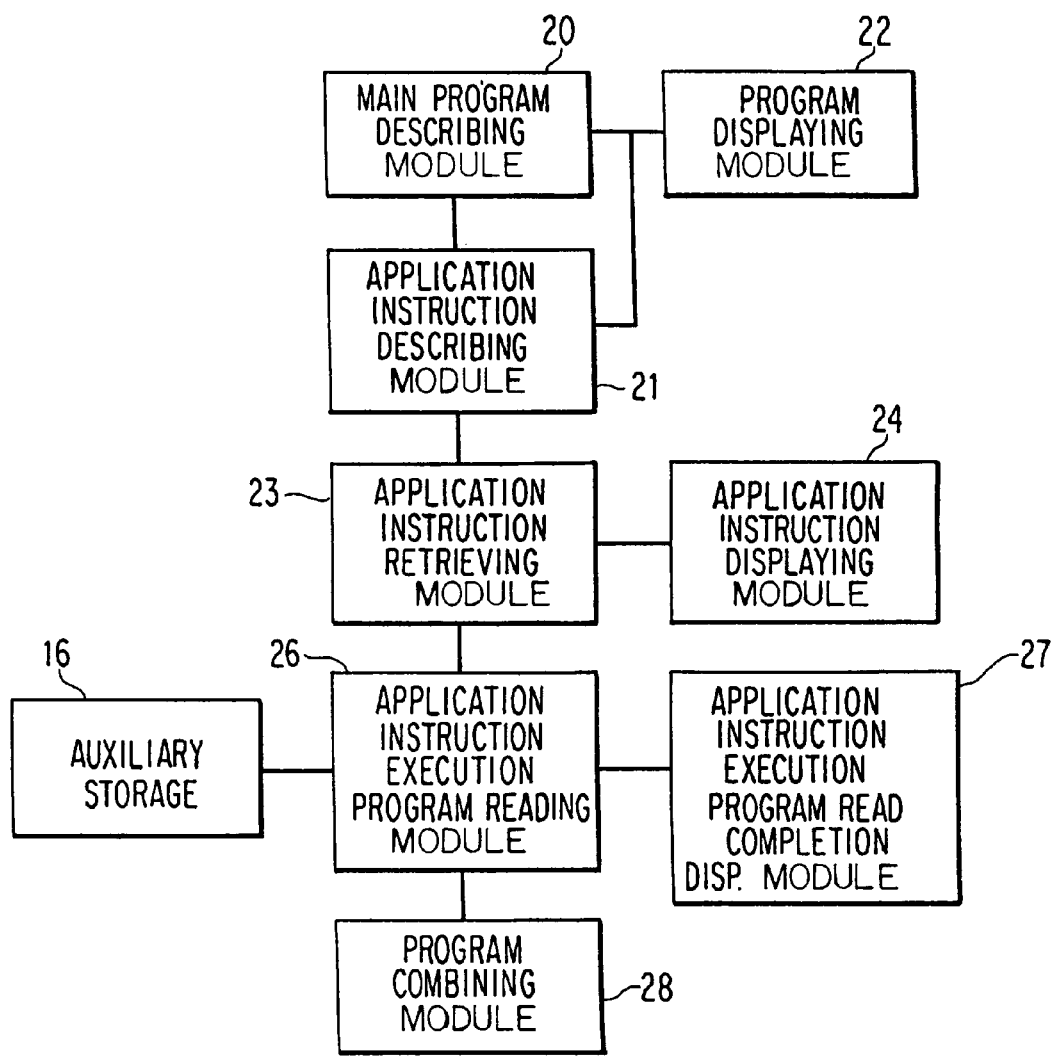
FIG. 1 is a block diagram indicating the chief functions of a programming unit according to one embodiment of the present invention.
Figure 7:
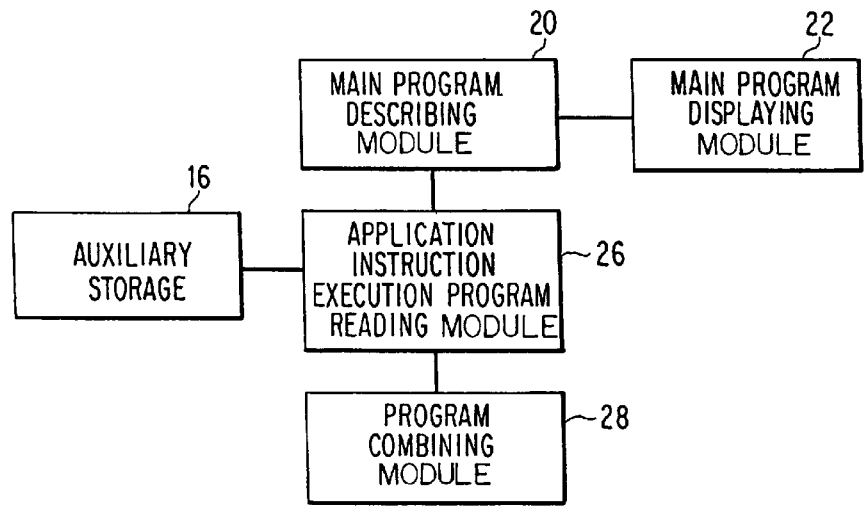
FIG. 7 is a block diagram showing the chief functions of the programming unit of the prior art.
Figure 8:
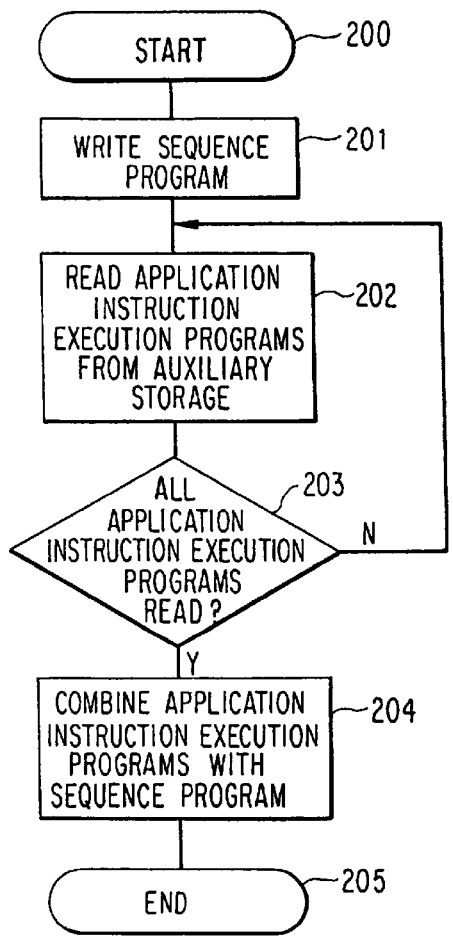
FIG. 8 is a flowchart showing a sequence program writing process using the programming unit of the prior art.

FIG. 1 is a block diagram which indicates the main functional module or tasking of the programming unit 11 in the embodiment of the present invention. As in the prior art illustrated in FIG. 7, various module are employed in the system program stored in the system program memory 14 in FIG. 6 and their functions are exhibited when the system program is executed by the CPU 13. Referring to FIG. 1, the numeral 21 indicates the application instruction describing module (task) for describing the application instructions, which are not included in the basic program instructions of the PC, using their common names when writing the sequence program. At 23 is the application instruction retrieving module or task which picks out the application instructions embedded in the sequence program. The application instruction displaying module (task) 24 displays the retrieved application instructions on the screen of the display device 18 in FIG. 6. Application instruction execution program reading module (task) 26 reads those application instruction execution programs that correspond to the displayed application instructions from the auxiliary storage 16, which acts as the auxiliary memory shown in FIG. 6. Application instruction execution program read completion displaying module (task) 27 causes display of an indication of the completion of the reading of the designated application instruction execution programs.

Figure 2:
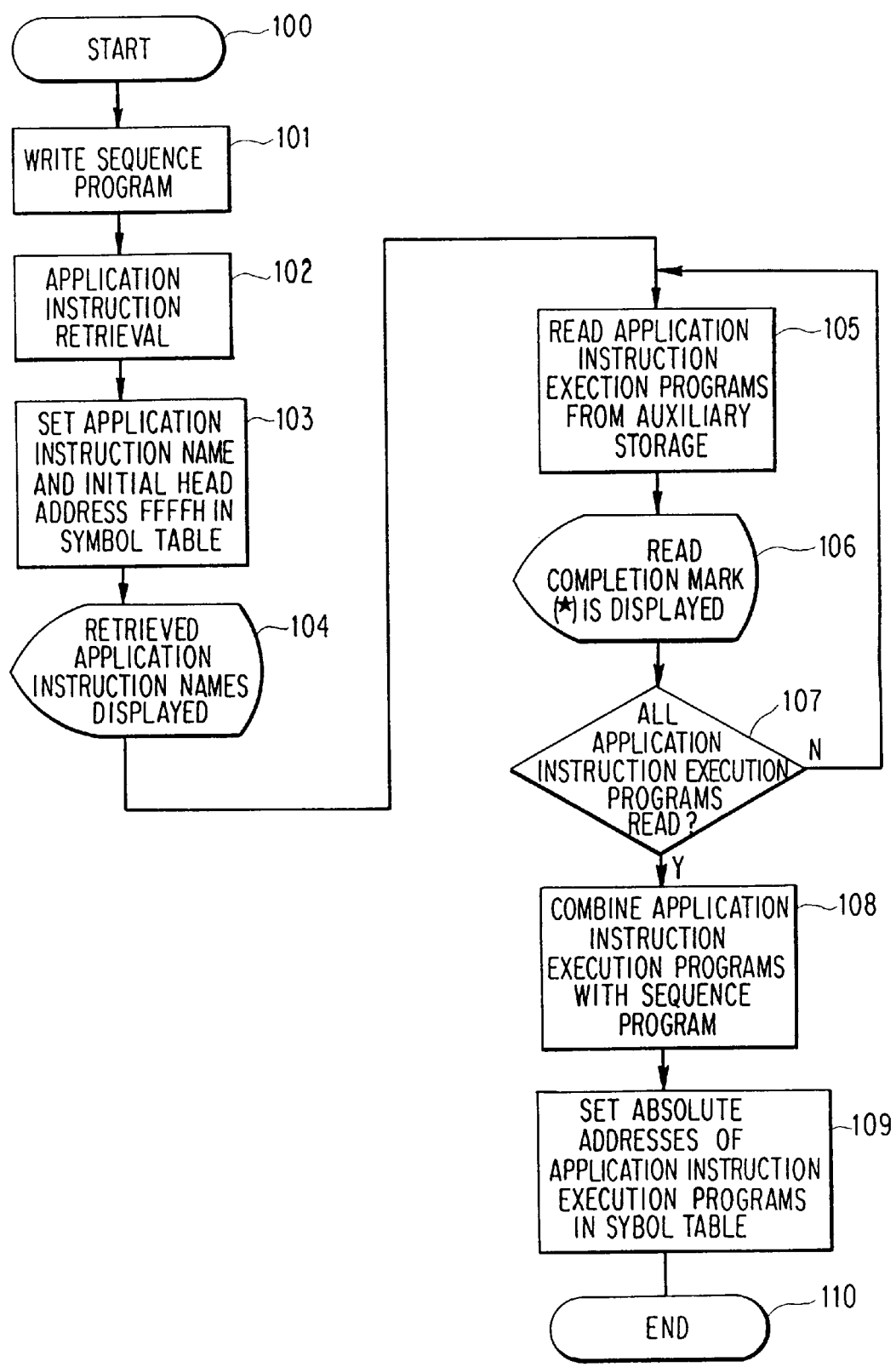
FIG. 2 is a flowchart showing a sequence program writing process performed via the programming unit illustrated in FIG. 1.
Figures 3, 4A, 4B:
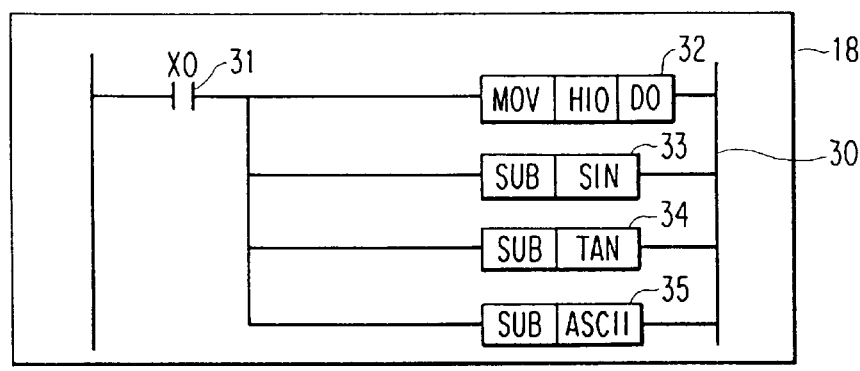
FIG. 3 shows an example of a part of a sequence program written by the programming unit illustrated in FIG. 1 as displayed on the display screen.
FIG. 4a shows an example of a display screen indication showing the application instructions retrieved from the sequence program segment illustrated in FIG. 3.
FIG. 4b shows an example of a display screen indication that the application instruction execution programs corresponding to the application instructions shown in FIG. 4a have been read from the auxiliary storage.
Figure 5A:
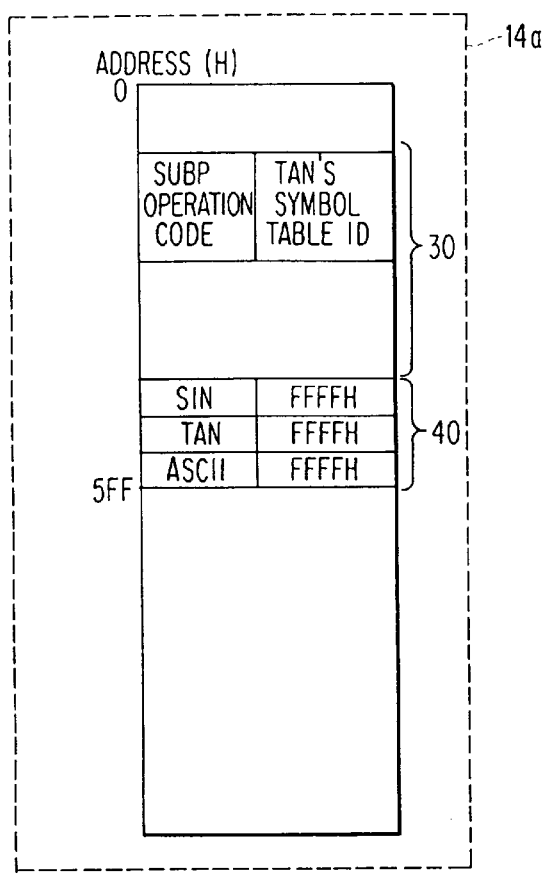
FIGS. 5a, 5b, and 5c illustrate a method of combining the application instruction execution programs with the sequence program.
Figure 5C:
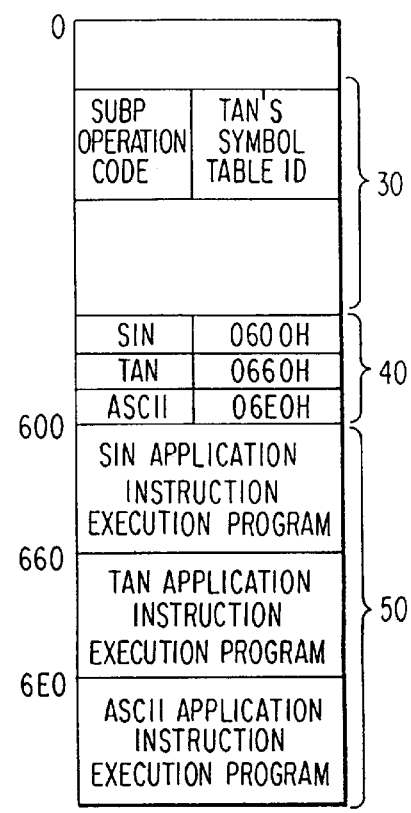
Figure 5B:
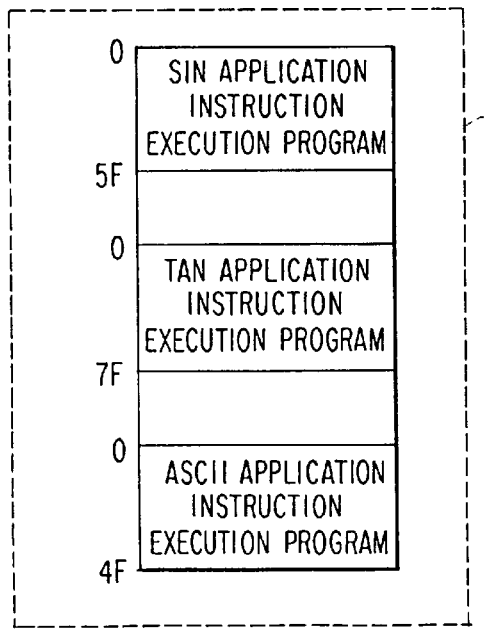
Figure 6:
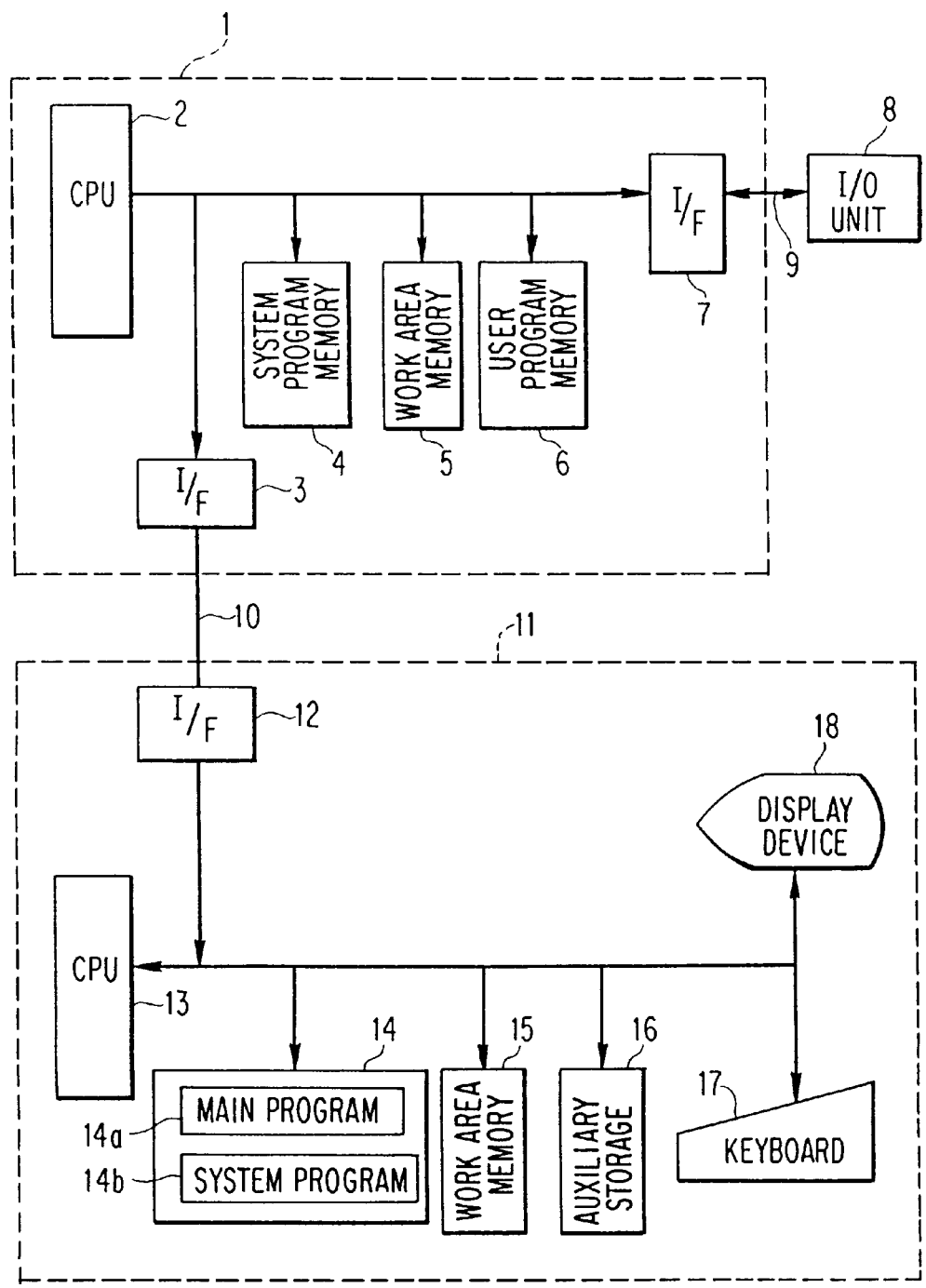
FIG. 6 is a block diagram indicating the general hardware configuration of a programmable controller and programming unit common to the embodiment of the present invention and the prior art.

FIG. 2 is a flowchart showing a sequence program write processing procedure according to this embodiment of the present invention. The sequence program writing procedure will be explained according to this flowchart. The operator starts up the programming unit 11 at step 100. At step 101, he writes a sequence program in which, when special application instructions are required, simply include the common operation designation names of the application instructions used. This step is performed employing the sequence program describing means 20 and the application instruction describing means 21 shown in FIG. 1. The sequence program is caused to be displayed on the screen of the display device 18 in FIG. 6 via the sequence program displaying module 22. FIG. 3 gives an example of a portion of a sequence program screen display in which the various application instructions (here, "SIN", "TAN" and "ASCII") are indicated by displaying their common operation designator names. That is, the application instructions are described by subprogram operation codes such as "SUB" or "SUBP", and the application instruction operation designator names "SIN", "TAN" and "ASCII" appear instead of the absolute addresses of the memory where the application instruction execution programs will be stored. At step 102, the special application instructions appearing in the sequence program are picked out automatically by the application instruction retrieving module 23 shown in FIG. 1. At step 103, at a point after the sequence program 30 in the main program area 14a of the system program memory 14 shown in FIG. 6, a symbol table 40 as shown in FIG. 5A is prepared. The symbol table stores the application instruction names (SIN, TAN, ASCII, etc.) as well as the head addresses in the program memory 14 where the corresponding instruction execution programs will be stored. As the actual head addresses are still unknown at this time, FFFFH is set as the initial value of the addresses storing the application instruction execution programs, which will be read at a later step. This address is simply a dummy address which will be replaced later on as indicated. At step 104, the system then causes the display of the retrieved application instruction operation designation names, e.g. "SIN", "TAN" and "ASCII" as shown in FIG. 4A, on the display device (18) screen, using the application instruction displaying module 24 shown in FIG. 1. In step 105, the application instruction execution programs corresponding to the above application instructions are read from the auxiliary storage 16 using the application instruction execution program reading module 26 shown in FIG. 1. All that is necessary is for the system to be able to find the programs. In the case of disk storage, this requires the operator to insert the disk including the designated program or programs ("SIN", etc.) into the drive. At step 106, when the reading of each application instruction execution program is complete, a "*" mark is displayed in the corresponding "READ" column on the screen of the display device 18 as shown in FIG. 4b, using the application instruction execution program read completion displaying module 27 illustrated in FIG. 1. If reading of all the corresponding application instruction execution programs is not yet complete at step 107, control is returned to step 105 and steps 105 and 106 are repeated. If reading of the above application instruction execution programs is complete, control progresses to step 108 where the read application instruction execution programs are combined with the sequence program. That is, the application instruction execution programs 50 in FIG. 5C for, e.g. "SIN", "TAN" and "ASCII" are read put of auxillary storage 16 and stored following the symbol table 40, which itself follows the sequence program 30 in the main program area 14a of the system program memory 14. In step 109, the first absolute addresses of the application instruction execution programs corresponding to the respective application instructions "SIN", "TAN" and "ASCII" are stored as shown in FIG. 5C. The program may be stored at any point in the memory where it is efficient to do so. The head addresses of the respective programs are noted at the time of their writing into the system program memory, and are used to replace the dummy addresses entered in step 103.

It will be apparent that in the embodiment described above, ease of writing a sequence program without the possibility of specifying a wrong absolute address for an application instruction execution program is ensured because the sequence program is written using only the application instruction name. The application instructions in the sequence program are automatically picked out, application instruction execution programs corresponding to the application instructions are read from the auxiliary storage and combined with the above sequence program, and the head addresses are set automatically.

Figure 12:
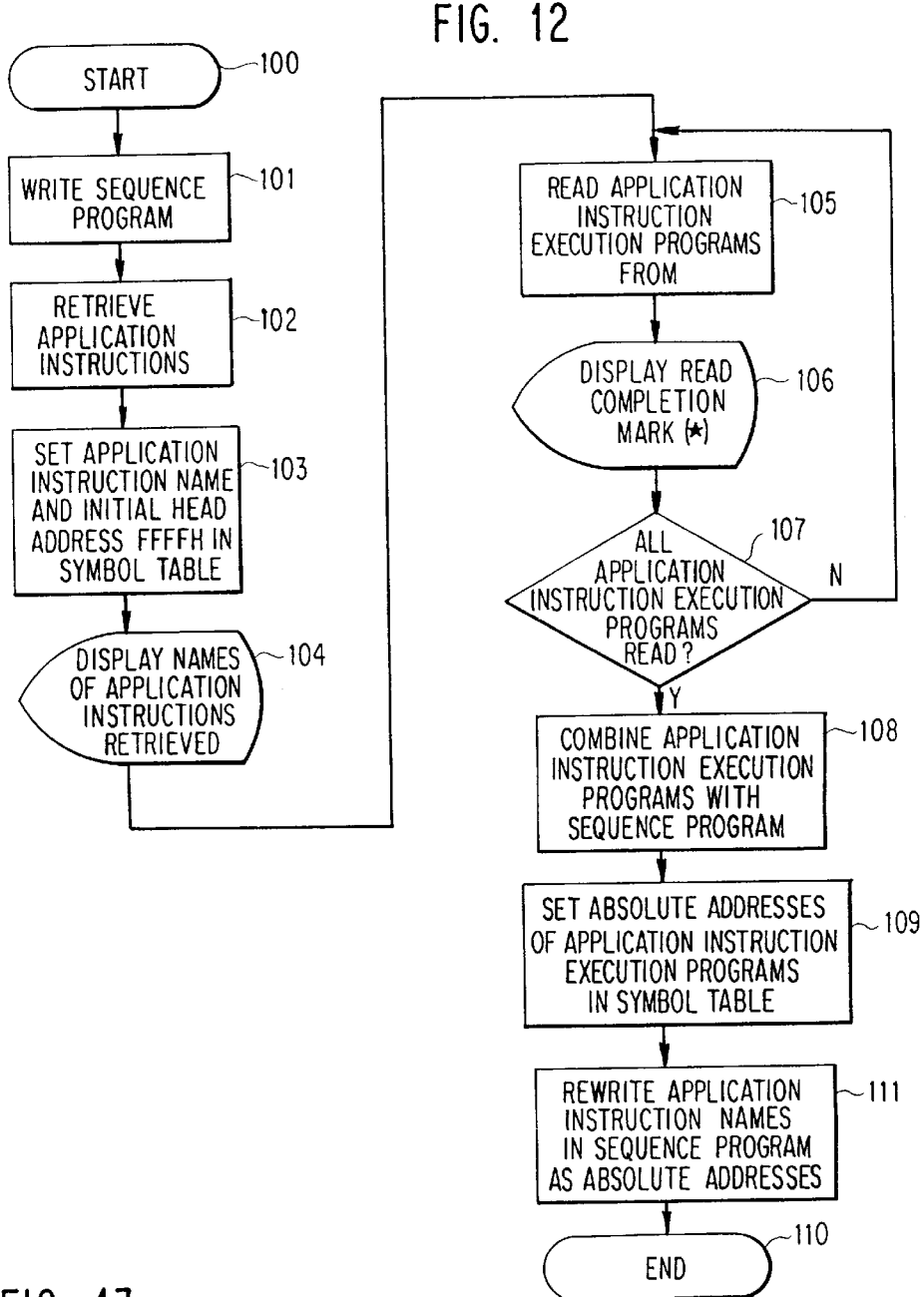
FIG. 12 is a flowchart which shows the processing steps conducted in the embodiment of FIG. 11.
Figure 13:
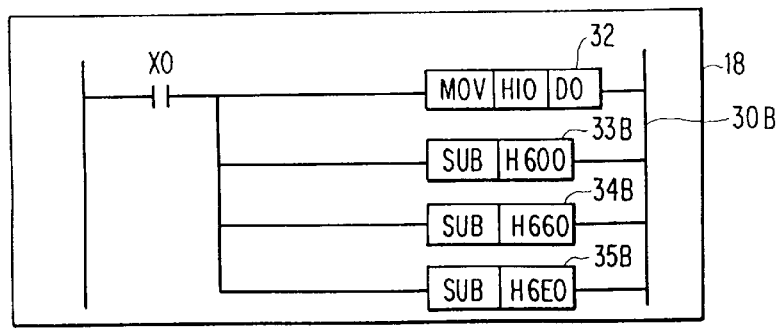
FIG. 13 illustrates the function of head address rewriting.

A further embodiment of the present invention is illustrated in FIGS. 11 to 13. FIG. 11 is a block diagram showing the main functions or module provided in the programming device of this embodiment. As illustrated in FIG. 11, this embodiment includes a program combining module 27a which includes a combining module 28 which is similar in function to the program combining module 27 shown in FIG. 1, and an address rewriting module 29 which rewrites the application instruction names described in the sequence program as absolute head addresses in the main storage area where the application instruction executing programs are to be found.

The operation of this embodiment is explained according to the flowchart shown in FIG. 12. The flowchart is similar to that of FIG. 2, but includes an additional step 111 between steps 109 and 110. In step 108, the application instruction execution programs are combined by the combining module 28 with the sequence program stored in the main program area 14a of the system program memory 14. At step 109, absolute head addresses of the application instruction execution programs, corresponding for example to the application instructions "SIN", "TAN" and "ASCII" set in the symbol table, are stored. The application instruction names used in the sequence program 30B are then changed (rewritten) by the address rewriting module 29, as shown at 33B to 35B in FIG. 13, to the absolute addresses in the main storage area. That is, the head absolute addresses (e.g. H600, H660, H6EO) of the application instruction execution programs corresponding to the application instructions "SIN", "TAN" and "ASCII" set in the symbol table are written in the sequence program.

In this embodiment, since the head addresses of the application instruction execution programs are written in the programs steps 33B to 35B of the application instructions before the execution of the sequence program, the application instruction names, such as "SIN", "TAN" and "ASCII", need not be translated using the symbol table and the execution speed of the sequence program may be increased.

What is claimed is:

1. A method of creating a control program for a programmable controller for controlling a controlled device, comprising the steps of:

(a) entering into a main memory, by use of an input device, a sequence program making up a sequence of operations to be incorporated into said control program, items which are entered to make up said sequence program including:

(1) basic program instructions which are directly executable by a processing unit;

(2) common operation designation names of application instructions, said application instructions each being the title of a respective subroutine composed of certain ones of said basic program instructions, said subroutines being previously stored in an auxiliary memory; and (3) data to be acted on by said basic program instructions and said application instructions;

(b) retrieving said subroutines from said auxiliary memory by:

(1) examining which common operation designation names of application instructions have been entered in said step (a) and (2) retrieving the subroutines which correspond to the entered common operation designation names; and (c) storing said retrieved subroutines into said main memory at a higher memory location as compared to the sequence program entered at step (a), wherein said retrieved subroutines are stored in consecutive ascending addresses in order of retrieval from said auxiliary memory;

further comprising a step (b)(3) of displaying a status of whether said step (b) has been partially or fully completed.

* * * * *